United States Patent [19]

Mitchell

[11] 3,880,219

[45] Apr. 29, 1975

[54] VEHICLE WHEELS

[75] Inventor: William Eric Mitchell, Coventry, England

[73] Assignee: Dunlop Limited, St. James's, London, England

[22] Filed: June 18, 1973

[21] Appl. No.: 370,707

[30] Foreign Application Priority Data

| July 6, 1972 | United Kingdom | 31618/72 |
| Jan. 9, 1973 | United Kingdom | 01064/73 |
| Jan. 9, 1973 | United Kingdom | 01065/73 |
| Apr. 4, 1973 | United Kingdom | 16107/73 |

[52] U.S. Cl. .......... 152/404; 152/405; 152/DIG. 10; 301/63 D
[51] Int. Cl. ............................................. B60c 5/16
[58] Field of Search .......... 301/63 R, 63 D, 63 PW, 301/64 SH, 64 SD, 97, 98; 152/396, 397, 398, 402, 403, 404, DIG. 9, DIG. 10

[56] References Cited
UNITED STATES PATENTS

| 1,639,108 | 8/1927 | Putnam | 152/405 |
| 1,795,472 | 3/1931 | Budd | 301/63 D |
| 2,905,223 | 9/1959 | Quaryle | 152/404 |
| 2,998,282 | 8/1961 | Moyer | 152/404 |
| 3,635,529 | 1/1972 | Nass | 301/65 |

FOREIGN PATENTS OR APPLICATIONS

| 1,166,435 | 1/1968 | United Kingdom | 152/404 |
| 792,233 | 3/1958 | United Kingdom | 152/404 |
| 1,237,238 | 6/1960 | France | 152/DIG. 10 |

Primary Examiner—M. Henson Wood, Jr.
Assistant Examiner—Reinhard J. Eisenzopf
Attorney, Agent, or Firm—Stevens, Davis, Miller & Mosher

[57] ABSTRACT

A wheel rim having two rim portions secured together by fastening members engaging radially inwardly extending attachment flanges, a channel being formed between the attachment flanges to receive a sealing ring of smaller width, measured in the radial direction of the rim, than that of the channel measured in the radial direction.

46 Claims, 21 Drawing Figures

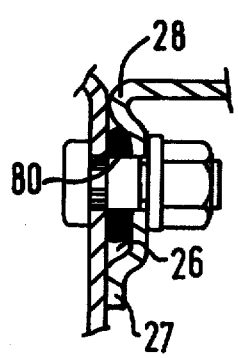
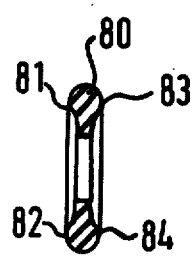
FIG.8    FIG.9    FIG.10
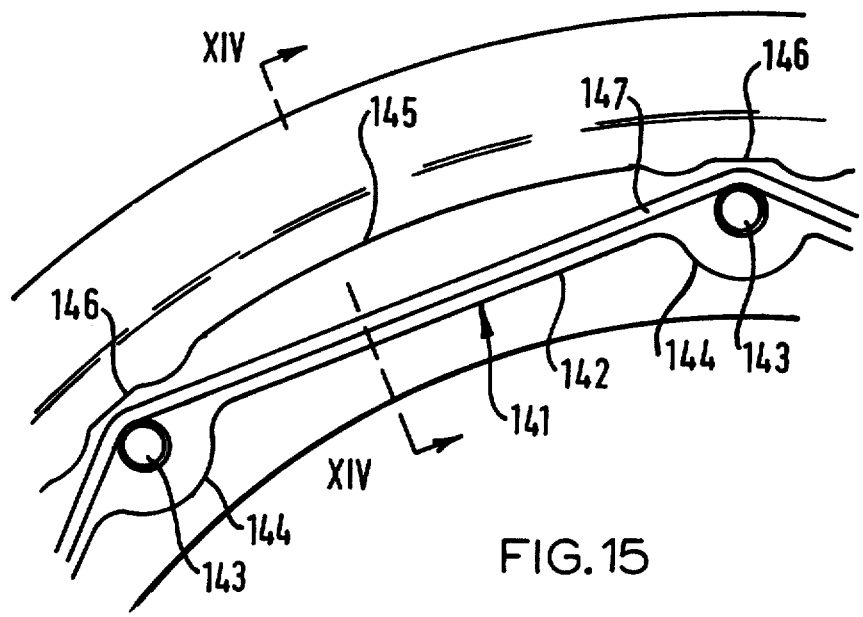
FIG.15

VEHICLE WHEELS

This invention relates to vehicle wheels of the divided-rim type, and more particularly to the provision of a seal between two portions of a rim assembly for use with tubeless pneumatic tires.

One object of the present invention is to provide effective and simple sealing means for a divided-type rim.

According to the invention a wheel rim comprises a pair of rim portions having annular attachment flanges extending inwardly in the radial sense relative to the axis of rotation of the rim, fastening means to provide an axial clamping load to urge the attachment flanges towards one another, and a sealing ring located in a circumferentially extending channel formed between the attachment flanges and bounded by circumferentially extending radially spaced-apart abutment zones through which substantially the whole axial clamping load on the attachment flanges is carried, the sealing ring being of smaller width, measured in the radial direction relative to the rim, than the width of the channel measured in said radial direction.

According to the invention also a wheel rim comprises a pair of rim portions having annular attachment flanges extending inwardly in the radial sense relative to the axis of rotation of the rim, fastening means to provide an axial clamping load to urge the attachment flanges towards one another, and a sealing ring located in a circumferentially extending channel formed between the attachment flanges and bounded by circumferentially extending radially spaced-apart abutment zones through which substantially the whole axial clamping load on the attachment flanges is carried, the fastening means comprising a series of axially extending fastening members passing through the attachment flanges and the channel, the sealing ring being located in the said channel so as to pass around the radially outer surfaces, relative to the axis of rotation of the rim, of the portions of the fastening members which lie within the channel, the sealing ring being of smaller width, measured in the radial direction relative to the rim, than the width of the channel measured in said radial direction.

The channel formed between the flanges may be formed as a circumferentially extending recess between a radially inner annular rib and a radially outer annular rib on one rim part, the ribs contacting the other attachment flange in a pair of radially spaced abutment zones; alternatively, an intermediate flange component, such as the outer part of a wheel disc, or a gasket may be interposed between the attachment flanges and this intermediate flange component may contact the annular ribs to form the abutment zones. In the case where an intermediate flange component is interposed the areas of junction of both attachment flanges with the intermediate flange component may be provided with channels and sealing rings as defined above.

The channel may be formed entirely as a recess in one attachment flange: alternatively both flanges may be formed with complementary circumferential recesses which together form the channel, or the flanges may be spaced to form the channel by an outer rib extending from one flange and an inner rib extending from the other flange.

The "sealing ring" referred to above must be of a resilient or plastic material which is capable of deformably reacting to a compressive force so as to accommodate variations in the surfaces of the flanges or other formations against which it is intended to make sealing engagement. The sealing ring is preferably of rubber or similar resilient elastomeric material and when such a ring is compressed between the two side walls of the channel the frictional engagement of the ring with the walls helps to retain the ring against radial displacement.

The sealing ring may be an O-ring of such dimensions that it lies in a taut (but not unduly stretched) condition around the fastening members, taking up a polygonal configuration. The sealing ring may be sufficiently taut to ensure that during assembly of the rim portions it remains in position around the fastening members, thus facilitating the assembly procedure.

The fastening members for securing the rim portions together may be studs which pass through the attachment flanges and also form means for locating the sealing ring in a polygonal configuration in the channel.

The attachment flanges of the rim portions could alternatively be secured together by wholly external clamping means, for example jaw-type clamps carried on the central portion of the wheel. In constructions of this kind, the sealing ring may be located in polygonal configuration in the relatively wide channel by locating abutments other than studs, such as axially-extending projections formed by a pressing operation in the base of a channel-forming recess in one rim portion, or projections formed by other means such as by welding-on suitable locating abutments in the recess of one rim portion.

The invention also provides a wheel rim comprising a pair of rim portions having annular attachment flanges extending inwardly in the radial sense relative to the axis of rotation of the rim, the attachment flanges of the respective rim portions being formed to define between them when in use a circumferentially extending channel to receive a sealing ring, the channel being bounded by a pair of radially spaced-apart circumferentially extending abutment zones, the radially outer abutment zone being formed so as to permit the channel to communicate with the radially outer surface of the rim, an opening being formed in one attachment flange to receive the stem of an inflation valve adaptor, said opening communicating with the interior of the channel and being spaced apart from the radially inner abutment zone to permit said sealing ring to pass between them. This arrangement has the important advantage that the valve adaptor does not need to pass through the rim base region, where it would constitute an obstruction to the passage of the inboard tire bead over the rim base during fitting, and would also restrict the space available within the wheel rim for accommodation of a brake disc or drum. Further, the valve adaptor can be of simple construction and is readily accessible from the outboard side of the rim.

Various embodiments of the invention will now be described, by way of example, with reference to the accompanying drawings in which:

FIG. 8 is a cross-sectional view on the line VIII—VIII of FIG. 7;

FIGS. 9 and 10 are axial cross-sectional views of forms of sealing band of the kind indicated in FIG. 7;

FIGS. 14 and 15 are views, corresponding to FIGS. 1 and 2, showing a further embodiment of the invention, FIG. 15 being a section as indicated by the line XV—XV in FIG. 14 and FIG. 14 being a cross-section as indicated by the line XIV—XIV in FIG. 15;

Figure 1:
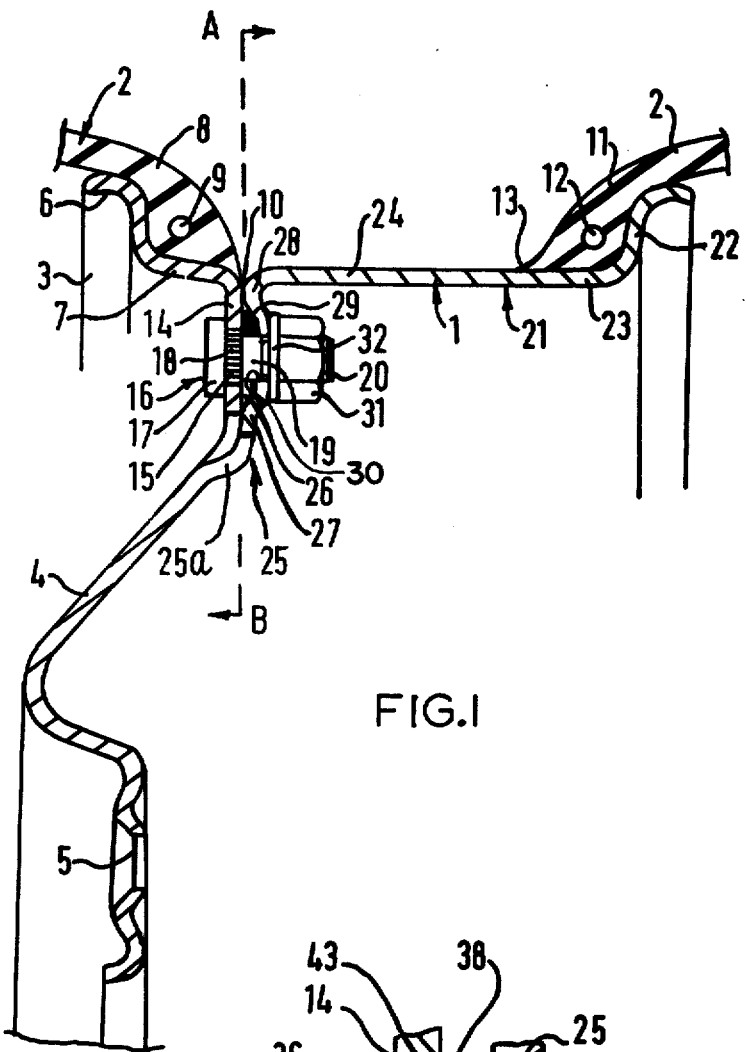
FIG. 1 is a cross-sectional view of part of a wheel and tire assembly in accordance with the invention.

As shown in FIG. 1, a wheel 1 for a pneumatic tire 2 suitable for use on a motor car comprises a first, outboard, rim portion 3 formed from a sheet metal pressing integrally with a wheel body portion 4 having apertures 5 by which the wheel is secured to the usual fastening studs carried on a vehicle hub.

It will be understood that the terms "inboard" and "outboard" refer to the normal orientation of the wheel relative to a vehicle to which it is fitted. The rim portion 3 incoporates a tire bead-retaining flange 6 and a bead seating portion 7 for a tire bead 8 incorporating an inextensible bead wire 9 and having an extended moulded rubber toe portion 10 for a purpose to be described. The other tire bead 11 incorporates an inextensible bead wire 12 and an extended toe portion 13 similar to the toe portion 10.

The rim portion 3 and the body portion 4 are joined through a radially extending attachment flange 14 which is drilled at eight circumferentially evenly spaced positions to provide apertures 15 in which fastening members in the form of studs 16 are located. The studs 16 have plain heads 17 and splined shanks 18 which are arranged to be a press fit in the apertures 15. The remaining portions of the studs 16 comprise a reduced diameter shank portion 19 and a screwed portion 20.

A second, inboard, rim portion 21 comprises a tire bead retaining flange 22 and bead seating portion 23. The second rim portion provides a cylindrical or "flat" base 24 and is joined to the first rim portion by a radially inwardly extending attachment flange 25, the radially inner edge of the flange 25 being spigot-located on four circumferentially-spaced lugs 25a pressed axially inwardly from the wheel body portion 4. The flange 25 is formed by a coining operation between dies to provide a channel 26 bounded on its radially inner side by a circumferential rib 27 and on its radially outer side by a circumferential rib 28, the ribs 27 and 28 forming circumferentially extending zones of contact with the flange 14 of the first rim portion and thus determining the axial depth of the channel 26 between the flanges 14 and 25. The radially extending sidewalls of the channel 26 are substantially flat and parallel to one another.

Figure 2:
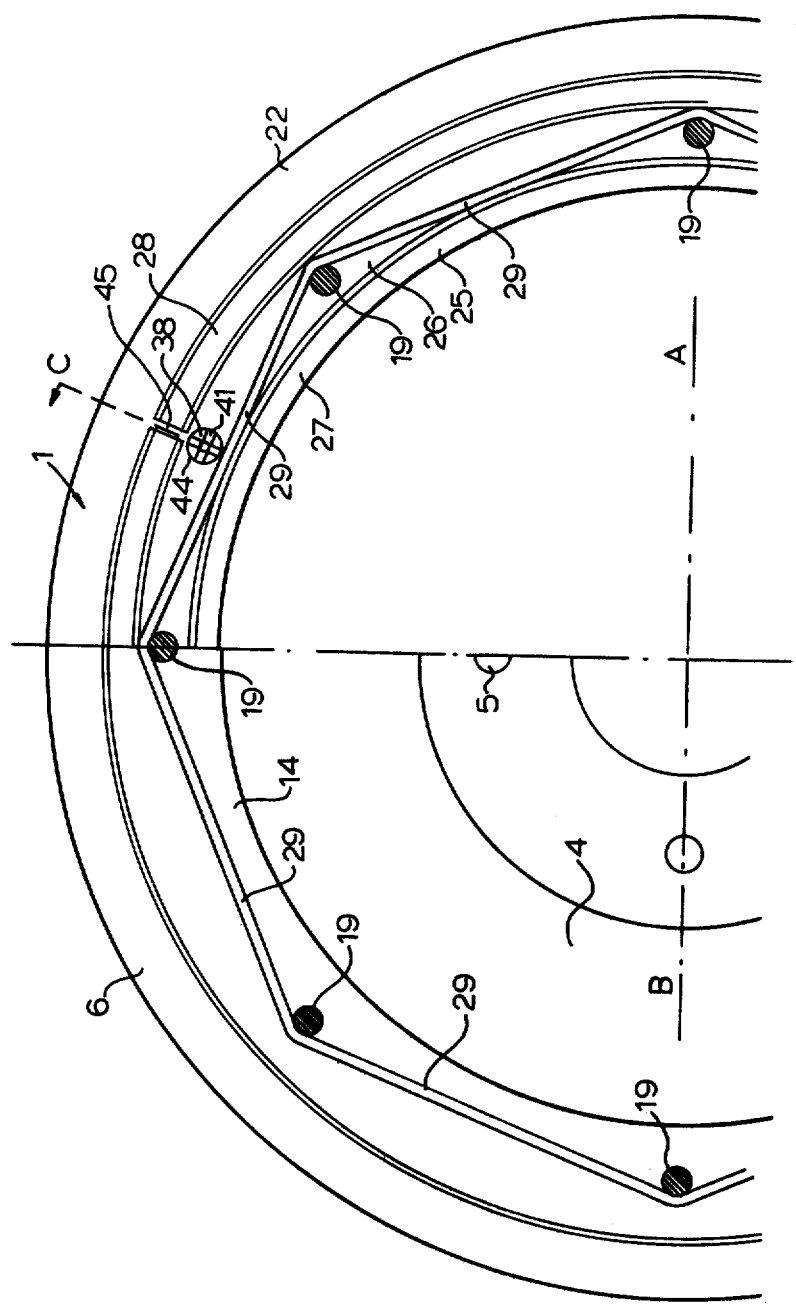
FIG. 2 is an axial end view of the wheel only showing on its left hand side a sectional view in the direction of the arrow B in FIG. 1 and on its right hand side a sectional view in the direction of the arrow A in FIG. 1.

In assembling the tire and rim the bead 11 is initially mounted on the second rim portion 21 and a rubber O-ring 29 is fitted under slight tension around the stud shank portions 19 on the first rim portion to take up a polygonal configuration as shown in FIG. 2. The two rim portions are then brought together so that the tire bead 8 is seated on the rim portion 3 and the screwed portions 20 of the studs 16 pass through apertures 30 in the attachment flange 25. Nuts 31 are then screwed on to the studs 16 to secure the rim portions together, washers 32 being provided between the nuts and the flange 25. The thickness of the O-ring is small relative to the width of the channel measured in the radial direction relative to the axis of rotation of the rim and is chosen so that when the rim portions are brought together it will be compressed sufficiently to provide an air-tight seal between the flanges. It will be noted that the nuts 31 lie on the inboard side of the wheel, and cannot therefore be inadvertently removed while the wheel is on a vehicle.

The radially inner wall of the channel 26 which is provided by the rib 27 renders it impossible for the sealing ring to escape from the channel, provided that the attachment flanges are properly secured together.

In the positions where the O-ring passes round the studs 16, it will be noted that sealing contact is made with the surfaces of the sides of the channel at a point which is displaced radially outwardly at a distance from the outer surface of the portion 19 of the stud equal to the radius of the O-ring, and this can easily be arranged to be greater than the clearance required for the apertures 30.

Figure 3:
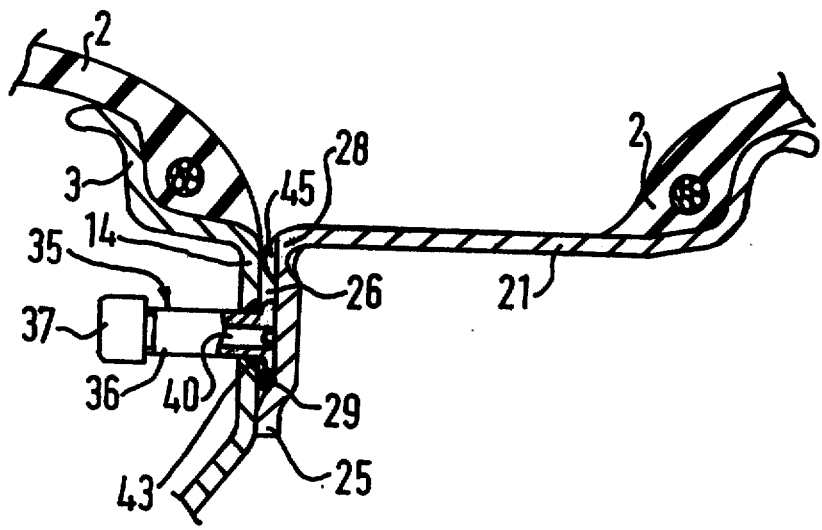
FIG. 3 is a further cross-sectional view of the wheel and tire assembly in the direction indicated by the arrow C in FIG. 2, showing an inflation valve.

An inflation valve assembly 35, shown in FIG. 3, comprises an adaptor in the form of a hollow stem 36 in which a conventional inflation valve insert (not shown) is provided, a cap 37 being screwed on to the outer end of the stem in the usual manner. The stem 36 has a head in the form of an integral flange 38 formed at its axially inner end, having a flat surface 39 on its axially outer side. An axial passage 40 through the stem 36 opens into crossed grooves 41, formed on the axially inner side of the flange 38, which communicate with the channel 26.

The stem 36 is located in an aperture 42 formed in the flange 14 and positioned radially outside the O-ring 29. The aperture 42 has a chamfered or frusto-conical inner surface 43 and an O-ring valve seal 44 is provided between the surfaces 39 and 43. In the assembled state as shown in FIG. 3 the flange 25 of the rim portion is pressed against the flange 38 which is thus urged towards the flange 14, compressing the valve seal 44 between the surfaces 39 and 43 (see also FIG. 4). The passage 40 of the valve stem 36 is thus in communication with a portion of the channel 26 which is sealed from the atmosphere and which communicates at its radially outer periphery with the interior of the tire.

Four grooves 45, equi-spaced circumferentially, are formed in the rib 28 of the flange 25 to ensure free communication between the channel 26 and the tire interior.

The valve assembly 35 is designed to be fitted loosely into the aperture 42 before assembly together of the two rim portions. Alternatively, the outer surface of the stem 36 could be screw-threaded for the major part of its projecting length to enable the stem to be clamped in position by a nut screwed on the stem and engaging the outer face of the flange 14. In the latter arrangement, as an alternative to the use of the valve seal 44 within the channel, a rubber sealing washer may be provided on the outboard side of the flange 14, the degree of compression of the sealing washer preferably being limited by the interposition of a dished metal cover washer between the sealing washer and the nut, the outer periphery of the cover washer overlying the sealing washer to engage the flange 14. The portion of the stem within the sealing washer and the channel is normally unthreaded.

The tire and wheel assembly described above has the advantage that it provides a "flat base" mounting for a tire, ensuring that in the event of deflation of the tire the tire beads cannot escape from the rim as they could in the case of a well base rim. This enables steering control to be maintained in the event of a puncture. The extended toe portion 10 of the bead 8 is located in a groove formed between the rounded edges of the rim portions at their line of junction, and this has been found to be of great value in retaining the bead 8 in position on its seating portion 7 when the tyre is running in a deflated condition, as described in the specification of our co-pending U.S. patent application Ser. No. 276,449 filed July 31, 1972. Extended running in the deflated condition is possible if means is provided for dispensing lubricant into the deflated tire, as described in the specification of our co-pending U.S. patent application Ser. No. 150,627 filed June 7, 1971.

The O-ring seal provided in the assembly described above is mounted in a different manner from that in which an O-ring seal is normally mounted, in that instead of locating the seal in a precisely defined circular groove it is allowed to define its own path in a channel which is relatively wide in the radial sense. For this reason, there is no need for precision in manufacture or assembly of the portion of the rim containing the sealing means, and the wheel rim assembly can therefore be manufactured more economically and reliably than has previously been the case with divided rims incorporating, for example, O-rings fitted into conventional close-fitting grooves.

Since the O-ring is fitted around the outer surfaces of the securing studs, it is constrained by the studs to take up a position in which it must seal the inflation pressure from escaping through the apertures surrounding the studs, and the positioning of the seal is effected in a particularly simple and reliable manner. Reliability in operation stems also from the fact that the compression of the O-ring requires only a low axial clamping force: on bringing the attachment flanges together the O-ring initially makes line contact with the flat surfaces forming the sides of the channel, and the compressive force required to distort the O-ring to an oval shape is therefore very small.

When a pair of annular flanges are bolted together with a sealing member between the flanges there is, in general, a possibility that the nuts and bolts securing the flanges together may be tightened unevenly relative to one another, and this may result in distortion of one area of the flanges relative to another area. As mentioned above, in the arrangement in accordance with the invention the clamping forces required are relatively small, and additionally the axial loads are taken mainly by the inner and outer ribs which define the channel in which the sealing ring is located. The ribs are relatively rigid and can take unbalanced clamping loads without undue distortion of the rim assembly. Since the O-ring seal is very narrow, the portions of the O-ring passing around the outer surfaces of the studs only require a small amount of space in the radial sense and it is therefore possible to locate the securing studs centrally (in the radial sense relative to the rim) in the channel. Since the studs are located centrally the clamping loads are therefore applied substantially equally to the inner and outer ribs, again reducing the risk of distortion.

While in FIG. 2 the O-ring is shown as assembled, extending in straight chordal lines between successive securing studs, it has been found that under inflation pressure the portions of the ring between the studs may be forced radially inwardly so as to take up a curved profile. The amount of radially inward displacement which is possible for any portion of the ring will depend on its distance from a point of support where the ring passes around a stud, and its distance from the inner circumferential rib 27 which limits the channel. In practice the portions of the ring in the mid-regions between studs may move inwardly to lie in contact with the inner circumferential rib 27 for substantial parts of their lengths. The eventual contour taken up by the ring will depend on a number of factors including the amount of axial compression of the ring (which may vary from point to point), the friction between the ring and the sidewalls of the channel, the hardness of the rubber, and the amount of tension set up in parts of the ring adjacent the studs; nevertheless, whatever contour is assumed by the ring in the channel it has been found that an effective seal is maintained. Thus by movement of the sealing ring the sealing system is able to compensate for slight irregularities etc. which may arise in the dimensions of its components during manufacture and the need for expensive manufacturing techniques to ensure absolute dimensional accuracy is obviated.

Figure 5:
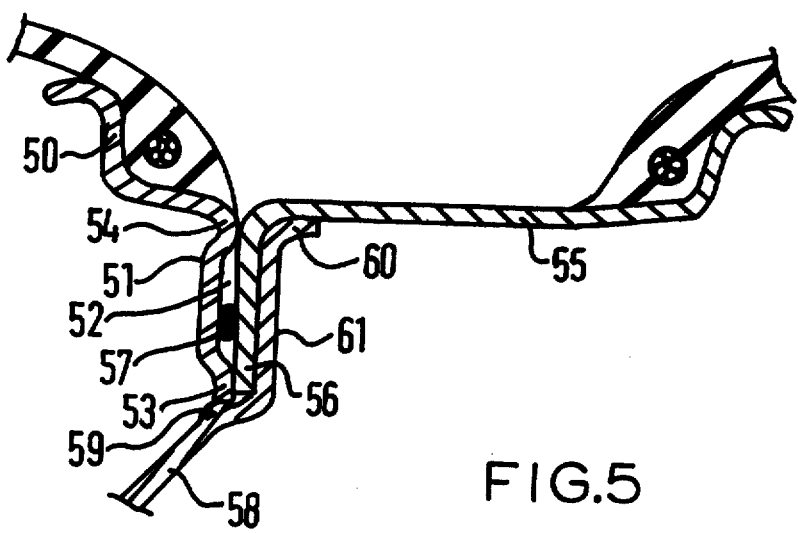
FIG. 5 is a cross-sectional view of part of an alternative wheel and tire assembly in accordance with the invention.

While in the embodiment described above the channel for the sealing ring is formed in the flange associated with the inboard rim portion 21, FIG. 5 shows an alternative arrangement in which an outboard rim portion 50 includes a flange 51 incorporating a channel 52 bounded by inner and outer ribs 53 and 54 respectively. The second, or inboard rim portion 55 comprises a flange 56, a sealing ring 57 being compressed between the flanges 51 and 56 by studs and nuts (not shown) arranged in a similar manner to that of FIGS. 1 and 2.

In the construction shown in FIG. 5 the rim portions are both formed separately from the wheel body portion 58 which includes three equally circumferentially spaced location shoulders 59 for the radially inner edge of the outboard flange 51 and an axially turned locating flange 60 for the inboard rim portion 55. The radially outer portion of the wheel body includes a wheel body attachment flange portion 61 which is spot-welded to the flange 56 and clamped to the flange 51 by the studs and nuts (not shown) which pass through all three flanges, the studs 16 being attached to the outboard rim portion 50 and the nuts thus being on the inboard side of the flanges as shown in FIG. 1. The arrangement shown in FIG. 5 is particularly economical to manufacture and is the preferred embodiment of the invention for motor car application, an additional advantage residing in the fact that the outboard rim portion is the removable part, this part being light and easy to handle.

The invention to which the present application relates is not restricted to the particular arrangement of the sealing ring disclosed in FIGS. 1–5, but comprises any suitable sealing ring configuration further examples of which are shown in FIGS. 6–10.

Figure 6:
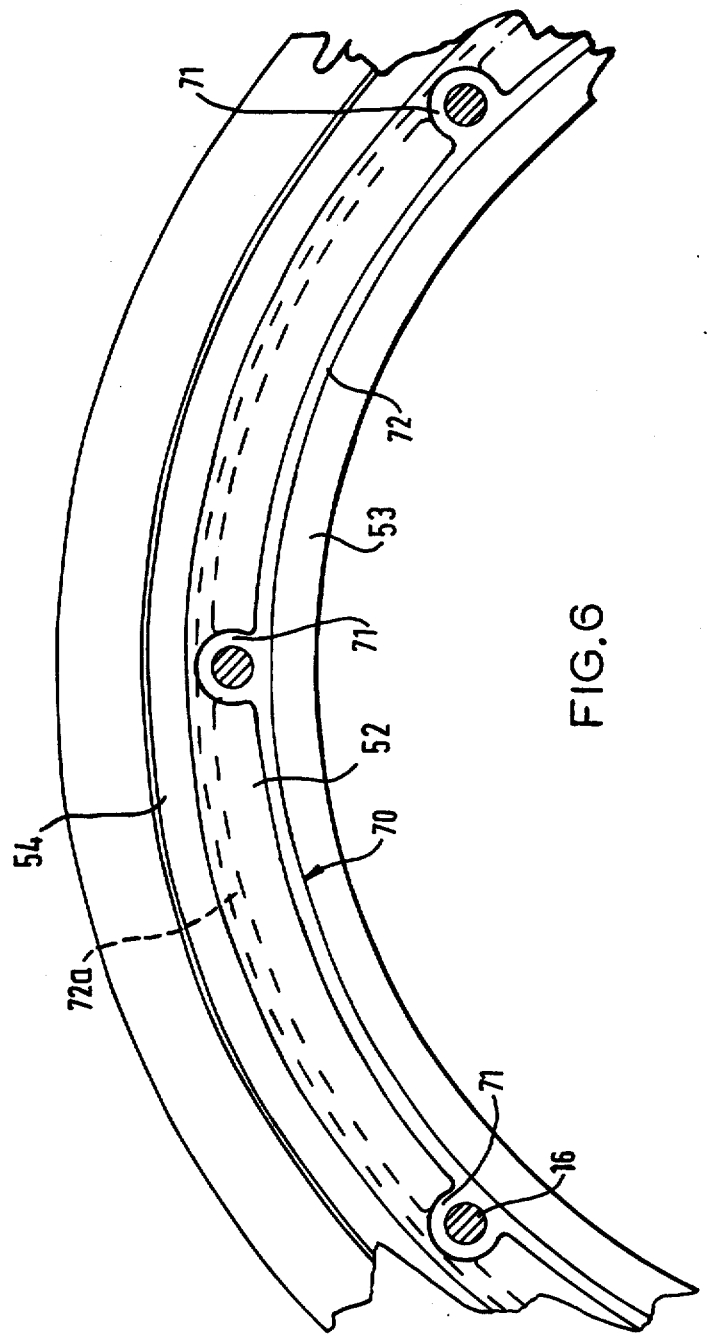
FIGS. 6 and 7 are axial sectional views of part of the rim shown in FIG. 5, showing alternative sealing ring constructions.

FIG. 6 shows a rubber sealing ring 70 which is moulded with integral annular sealing washer portions 71 and is mounted with the sealing washer portions 71 fitted around the securing studs 16. The sealing ring 70 also comprises ring portions 72 extending between the studs and arranged to rest in the radially inner part of the channel when the two rim portions are brought together.

When the rim portions are assembled together and the tire is inflated, there is a possibility that the inflation pressure may force the portions 72 of the sealing ring radially inwardly, but such movement of the ring as may occur is limited by the circumferential rib 27 which provides a radially inner wall for the channel.

While in the embodiment described above the sealing ring comprises sealing washers 71 for the studs which are formed integrally with the remaining portions of the ring, it would be possible for the sealing ring to be a plain O-ring lying within the inner surfaces of the studs, or outside the studs, and for separate sealing washers to be provided for the studs. Also, the arrangement shown in FIG. 6, in which the portions 72 of the sealing ring lie wholly around the inner region of the channel 26, could be replaced by an arrangement in which the portions 72 were attached to the radially outer portions of the washers 71 as indicated in dotted lines at 72a in FIG. 6. A further alternative arrangement might take the form of a sealing ring in which inner and outer ring portions 72 and 72a are both provided as shown in FIG. 6, a sealing ring assembly thus providing two complete annular sealing rings concentrically arranged and having integrally formed washer portions to seal each stud hole. Alternatively again, the portions of the sealing ring assembly between the studs may be in the form of an annular band of rubber or other suitable sealing material such as bonded cork having a width in the radial sense relative to the axis of the wheel which is less than that of the channel 26. Such an arrangement is indicated in FIGS. 7 and 8 which shown such a band 80 in position between the radially inner and outer walls 27 and 28 respectively of the channel 26.

To improve its sealing properties, the band 80 may be formed with projecting annular ribs 81–84 as indicated in FIG. 9, or the annular ribs may be provided by forming on a band 86 a saw-toothed profile as shown in FIG. 10.

Figure 4:
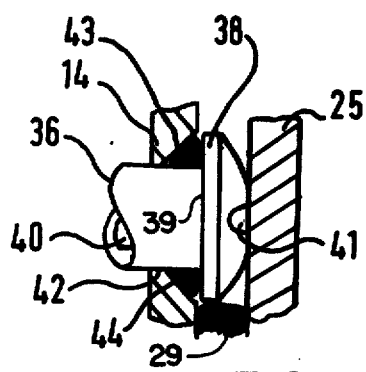
FIG. 4 is an enlarged scrap cross-sectional view showing a detail of FIG. 3.
Figure 7:
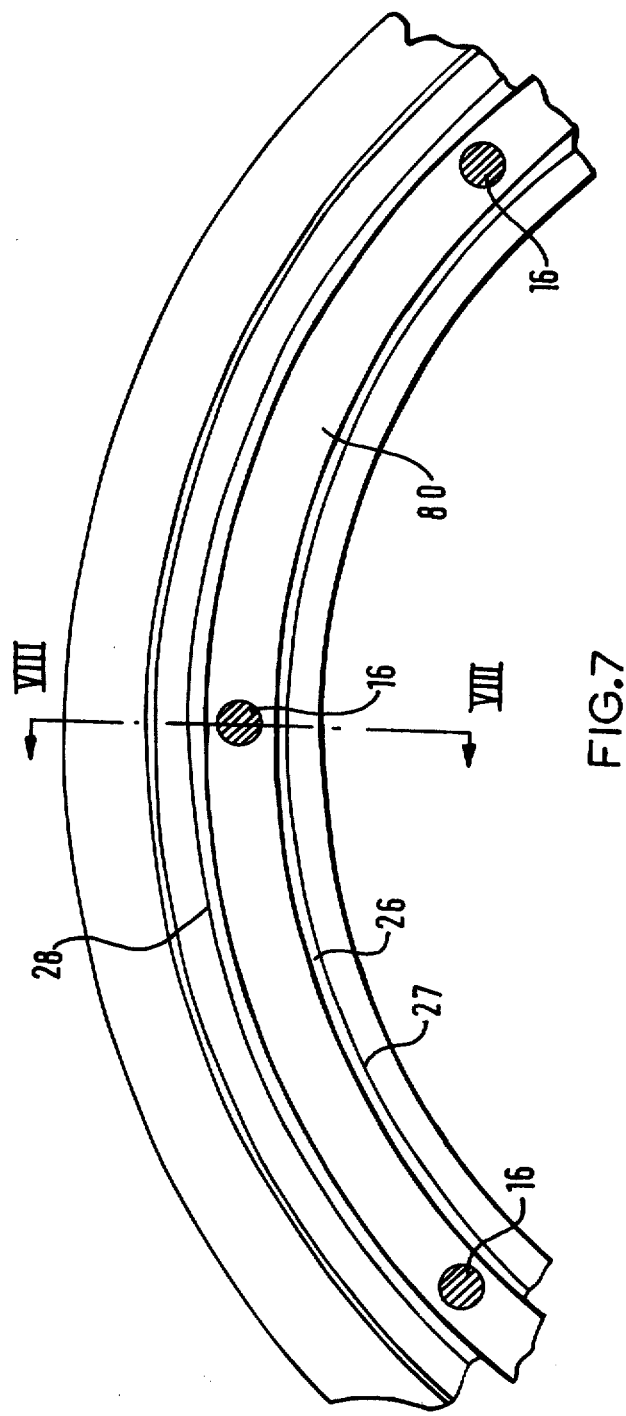

The constructions where a sealing ring or band of substantial radial width is employed, as in FIGS. 7 and 8 and where sealing of the radially outer part of the channel is provided, e.g. by ring portions 72a as shown in FIG. 6, the valve adaptor shown in FIGS. 3 and 4 could not be used unless some means e.g. a cut-out in the band was provided to enable air to pass from the adaptor into the tyre. Alternatively, a valve adaptor could be fitted in the base of the rim in such cases.

Figure 11:
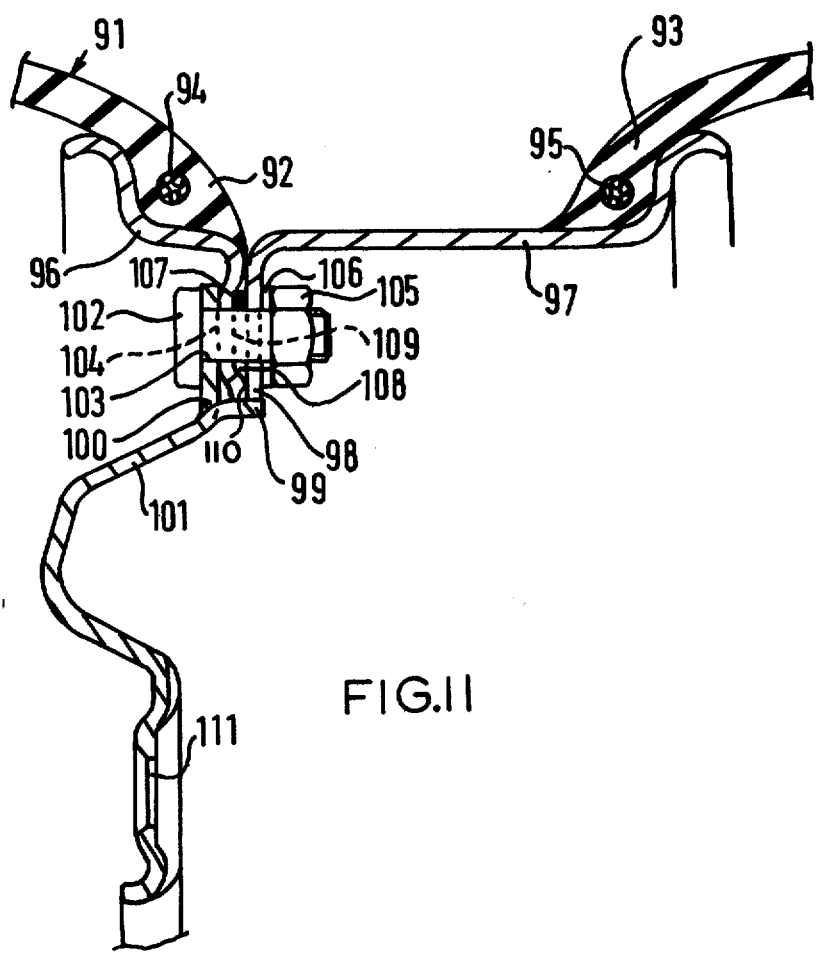
FIG. 11 is a cross-sectional view of part of an alternative wheel and tire assembly in accordance with the invention, taken on the line XI—XI of FIG. 12.
Figure 12:
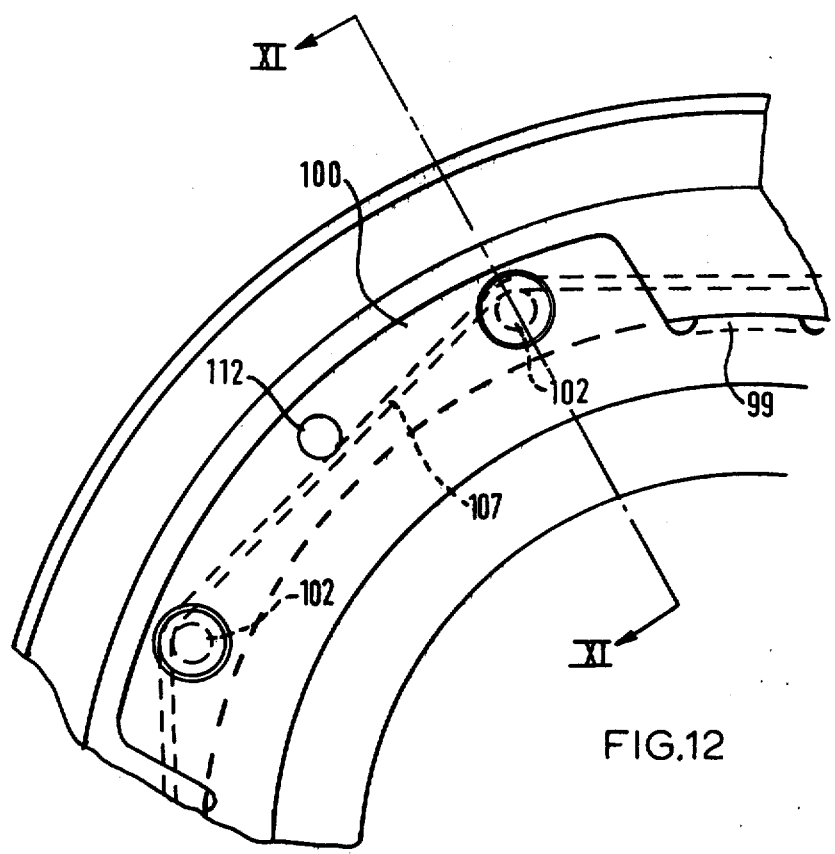
FIG. 12 is an axial end view of the wheel only as shown in FIG. 11.

The wheel and tire assembly shown in FIGS. 11 and 12 comprises a tire 91 having beads 92 and 93 reinforced by bead wires 94 and 95 respectively. The beads 92 and 93 are seated, respectively, on an outboard rim portion 96 and an inboard rim portion 97. The inboard rim portion 97 has a radially inwardly extending attachment flange 98 which is located against radial movement by four lugs 99 which are pressed out from the radially outer portion 100 of the wheel disc portion 101 so as to extend axially into engagement with the radially inner edge of the flange 98. Studs 102 are located in holes 103 in the outer portion 100 and corresponding holes in the attachment flange 104 of the outboard rim portion and the attachment flange 98 of the inboard rim portion. The studs 102 are secured in position by nuts 105 and washers 106.

A rubber O-ring 107 is located in a channel 108 formed as a circumferential recess 109 in the outboard rim portion, and extends circumferentially around the joint between the two rim portions, taking up a polygonal configuration as indicated in dotted lines in FIG. 12. Inward displacement of the portions of the sealing ring between the attachment studs 102 is prevented by a shoulder 110 forming the radially inner wall of the channel 109.

The wheel disc portion 101 is arranged to be detachably secured to a hub in the conventional manner, holes 111 being provided for the normal wheel studs. The radially outer peripheral portion of the wheel disc portion is welded in four positions 112 to the outboard rim portion for additional strength.

Figure 13:
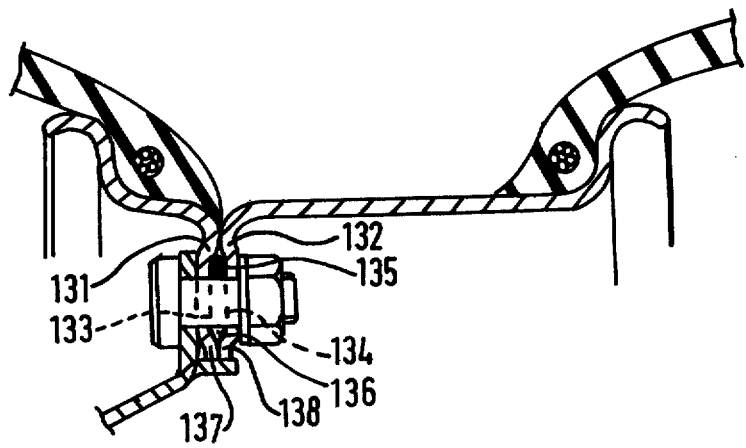
FIG. 13 is a view similar to FIG. 11 showing a variation in the general construction shown in FIG. 11.

In the alternative embodiment illustrated in FIG. 13, the general construction of the wheel and tire assembly is similar to that shown in FIGS. 11 and 12, but the radially inwardly extending attachment flanges 131 and 132 shown in FIG. 13 are both provided with circumferentially extending recesses, 133 and 134 respectively, which serve to accommodate an O-ring 135. The radially inner wall of the channel 136 formed by the recesses 133 and 134 is provided by the abutment together of shoulders 137 and 138 formed on the respective flanges 131 and 132.

As mentioned above, in some circumstances it has been found that the O-ring does not extend in straight chordal lines between the attachment studs as shown in dotted lines in FIG. 12, but may, in the region between the studs, be forced radially inwardly by inflation pressure. In an alternative construction shown in FIGS. 14 and 15, the radially inner shoulder which bounds the channel is arranged to conform approximately to the profile of the O-ring so as to limit radially inward movement thereof.

Figure 14:
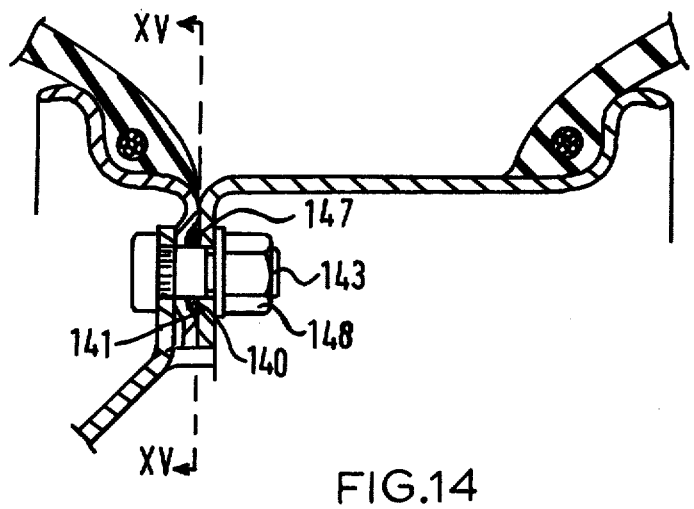

The wheel and tire assembly of FIG. 14 is generally similar to that shown in FIG. 11, and will not be described in detail. It will be noted, however, that the channel 140 shown in FIGS. 14 and 15 is of reduced radical width in some regions compared to that illustrated in FIGS. 11 and 12. The radially inner edge of the channel 140 is formed by a shoulder 141 which has a portion 142 extending substantially chordally between the studs 143 and merging into an arcuate portion 144 passing around each of the studs.

The radially outer edge of the channel is formed by a shoulder 145 which extends circumferentially throughout the greater part of its length, but which also takes an acruate path in the region 146 passing around the studs 143.

The effect of shaping the channel 140 as shown in FIGS. 14 and 15 is to provide support, should it be needed, in the regions near to the studs 143 so as to prevent excessive radial displacement and consequent tensioning of the O-ring 147. A further advantage of providing the curved portions 144 and 146 of the shoulders 141 and 145 respectively around the studs 143 is that when the nuts 148 are tightened on the studs a firmer support is provided, giving greater resistance to deformation of the attachment flanges and consequent variations in the depth, in the axial sense, of the channel 140.

The arrangements shown in FIGS. 11-14, like that shown in FIG. 5, are more economical in manufacture than that of FIG. 1 and are of particular value for use in vehicle wheel assemblies which are of small diameter and which are required to accommodate a relatively large brake drum or disc within the inboard rim portion. By attaching the wheel disc portion to the outboard side of the outboard rim portion attachment flange, greater axial clearance is provided within the confines of the rim, and the axially turned lug portions 99 provide a valuable means of centring and firmly locating the inboard rim portion.

Figure 16:
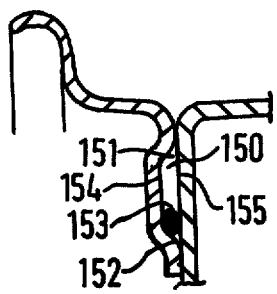
FIG. 16 is a scrap axial cross-sectional view showing an alternative form of channel for location of a sealing ring.

FIG. 16 is a detail view illustrating an alternative arrangement for ensuring adequate compression and preventing undue radially inward displacement of the sealing ring. As shown in FIG. 16, the channel 150 has a tapering cross-section considered in a plane containing the axis of the rim (the angle of taper has been exaggerated in FIG. 16, for clarity). The channel 150 has a maximum axial width adjacent its radially outer edge 151 and a minimum axial width adjacent its radially inner edge 152. The effect of this in practice is that the sealing ring 153 may be forced radially inwardly by inflation pressure, inward movement of the ring ceasing when the wedging action set up as the ring is forced between the mutually inclined surfaces 154 and 155 which bound the channel 150 provides sufficient resistance to further movement. The effect of any displacement of the sealing ring in the radially inward direction by the inflation pressure within the tyre is to cause the sealing ring to be increasingly axially compressed between the mutually inclined side walls of the channel. This additional axial compression enhances the ability of the sealing system to compensate for any variations, due to manufacturing tolerances or irregularities in assembly, which may occur from place to place in the axial width of the channel; in any localized region where the width of the channel may be too great to enable the associated portion of the ring to be gripped sufficiently strongly between the side walls of the channel to hold it in position, that portion of the sealing ring will be driven inwardly until the radially outward reaction on it due to the wedging action is sufficient to prevent further radial movement. Correspondingly, the radially inward movement will increase the axial compression and thus the effectiveness of the seal between the ring and the side walls of the channel.

FIG. 16 shows a tapering channel in which the mutually inclined side walls are substantially flat: they could alternatively be of curved profile, and in practice the production of a channel by stamping and coining operations tends to produce a rounded profile at the radially inner and outer edges of the channel even when the channel is nominally parallel-sided. A wedging action may therefore be obtained in practice even with a parallel-sided channel if the sealing ring is pressed by inflation pressure into the region adjacent the inner circumferential rib which bounds the channel.

In the embodiments shown in FIGS. 17-20 a split rim disc wheel comprises a disc portion cast in light metal alloy.

Figure 17:
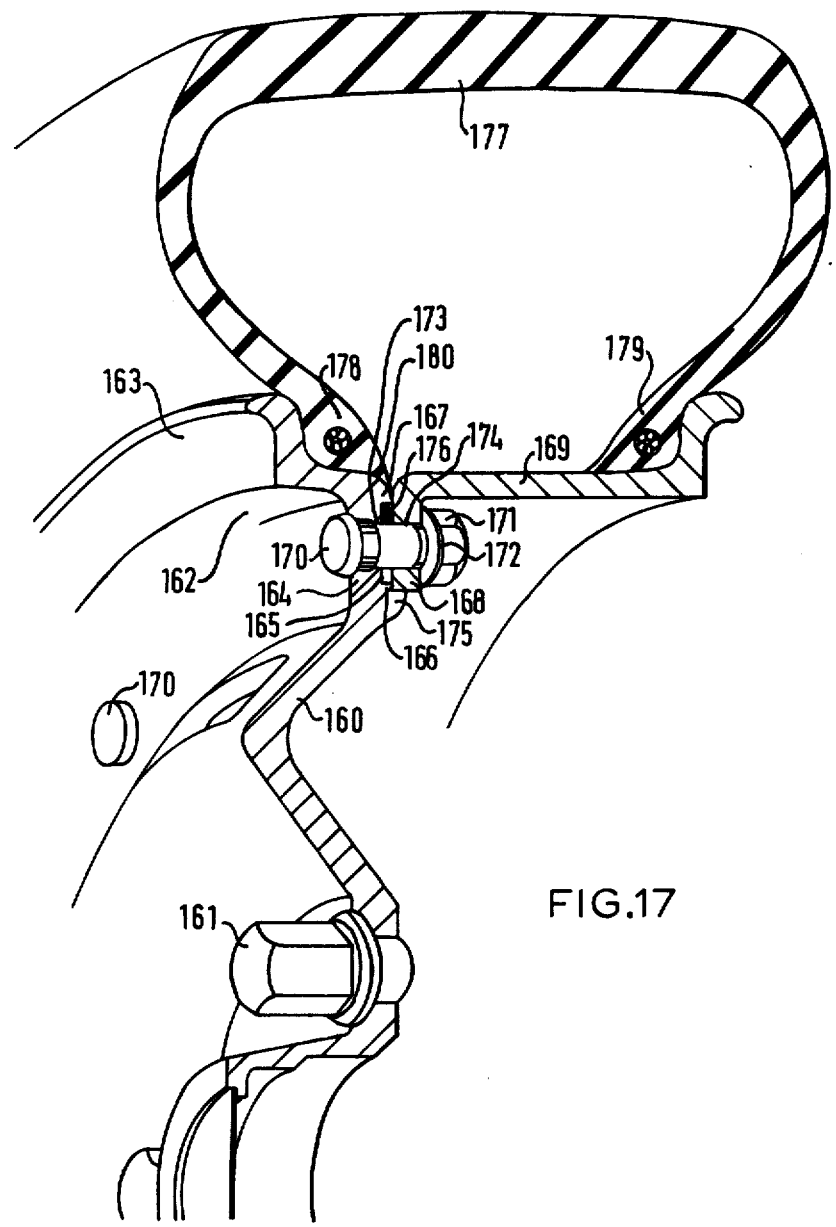
FIGS. 17 to 20 are partly perspective cross-sectional views illustrating further alternative forms of wheel rim in accordance with the invention.

FIG. 17 shows a disc portion 160 arranged to be secured to a hub by nuts 161 and having an outboard rim portion 162 incorporating a tire bead retaining flange 163 formed integrally therewith. An attachment flange portion 164 is provided with a channel 165 bounded by ribs 166 and 167 which form abutment zones with a radially extending attachment flange 168 formed on an inboard rim part 169 which is also of cast light metal alloy. Fastening studs 170, which engage nuts 171 and washers 172, pass through aligned holes 173 and 174 in the flanges 164 and 168 respectively to secure the inboard rim portion to the wheel disc portion 160, the inboard rim portion being located against radial displacement relative to the wheel disc and outboard rim portion by a spigot 175. A rubber O-ring 176 is fitted around the studs 170 in the manner illustrated in FIG. 2 to seal the area of junction between the attachment flanges. A tubeless tire 177 is mounted with its bead portions 178 and 179 seated on the rim portions, a projecting toe portion 180 on the bead portion 178 resting in a groove of radially inwardly tapering profile formed at the outer line of junction of the rim portions, as in the arrangement shown in FIG. 1.

An inflation valve (not shown) is provided, for example as shown in FIG. 3.

Figure 18:
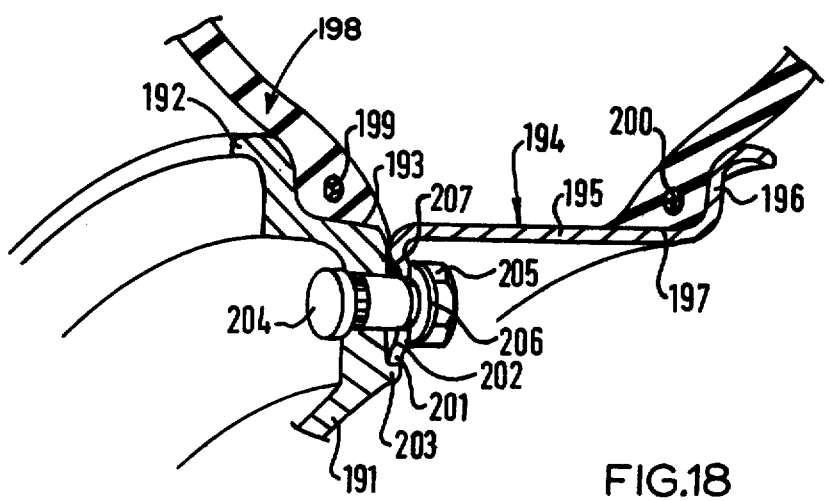

FIG. 18 shows an alternative construction in which a cast light metal alloy disc portion 191 is formed with one tire bead retention flange 192 and one tyre bead seat 193. An annular rim portion 194 of sheet steel provides the rim base 196 and the other tire bead retention flange 196 and bead seat 197. A tire 198 incorporating beads 199 and 200 is seated on the rim.

The sheet metal rim portion 194 is provided with a radially inwardly turned locating flange 201 formed with a circumferentially-extending groove 202 produced by a coining operation and is located at its radially inner edge around an annular spigot 203 formed on the disc portion 191.

The flange 201 is secured to the disc portion 191 by means of studs 204 passing through the disc portion and engaged by nuts 205 and washers 206 to hold the flange in position. An O-ring seal 207 is positioned around the radially outer surfaces of the studs 204 to seal the joint between the disc portion and rim portion, the ring 207 extending around the studs 204 in a polygonal configuration as described with reference to FIG. 2. An inflation valve (not shown) may be provided in the channel as shown in FIG. 3 or in the sheet metal rim portion.

Figure 19:
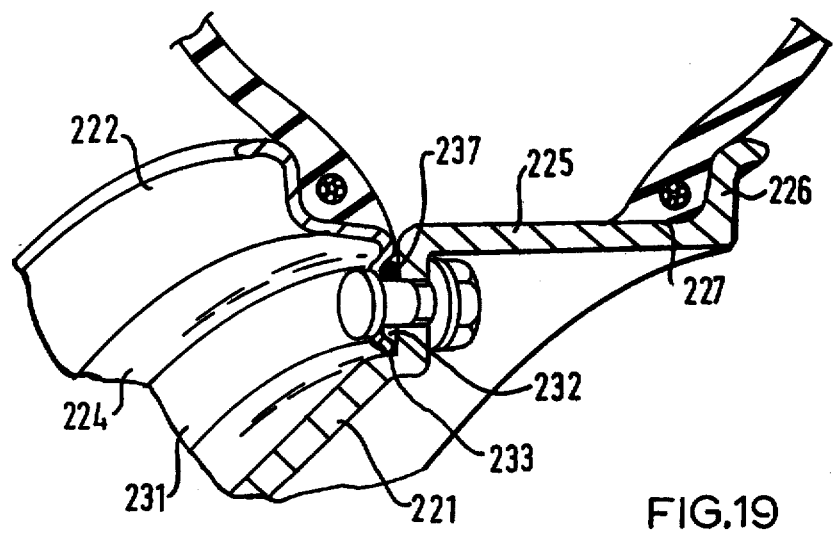

FIG. 19 shows a variation in which the wheel disc 221 of the arrangement of FIG. 18 is extended to form the rim base portion 225 and the inboard flange 226 and bead seat 227. The outboard rim portion 224 comprises a tire bead retaining flange 222 and a radially inwardly extending locating flange 231 formed with a channel 232. The flange 231 is spigot-located on a shoulder 233 in a similar manner to the location of the flange 202 on the spigot 203 in the embodiment shown in FIG. 18 above, and the joint is sealed by an O-ring 237, again arranged similarly to the O-ring 17 shown in FIGS. 1 and 2.

Figure 20:
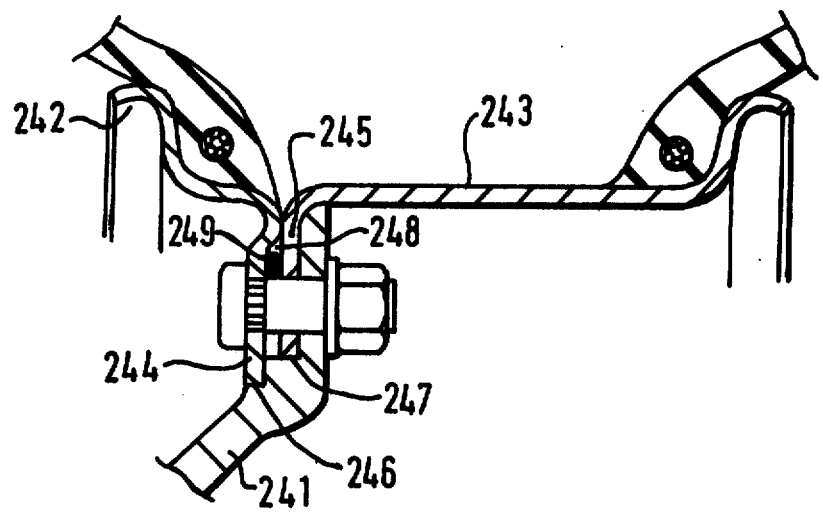

FIG. 20 shows a further variation of the arrangement of FIG. 18 in which the wheel disc 241 is again of a light metallic cast alloy material but which incorporates two sheet steel rim portions 242 and 243. The rim portions incorporate radially inwardly turned locating flanges 244 and 245 respectively, which rest, respectively, on locating shoulders 246 and 247 formed on the disc portion 241. The joint between the two rim portions comprises a channel 248 which is sealed by an O-ring 249 in a similar manner to the joint illustrated in FIGS. 1 and 2.

Figure 21:
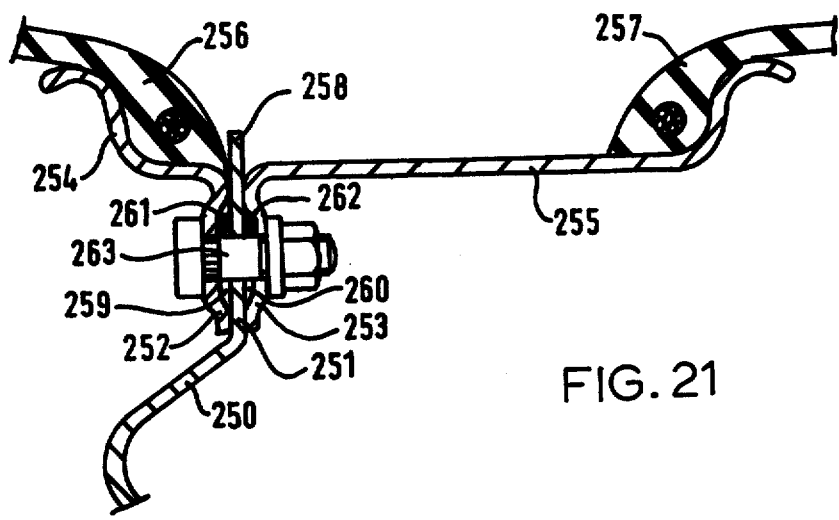
FIG. 21 is an axial cross-sectional view showing part of a further alternative wheel construction in accordance with the invention.

FIG. 21 shows a further alternative arrangement in accordance with the invention, in which a wheel disc portion 250 has an outer region which extends radially as an intermediate mounting flange component 251 between attachment flanges 252 and 253 of a pair of rim portions 254 and 255 respectively. A tubeless tire having beads 256 and 257 is seated on the rim assembly, and the radially outer edge 258 of the flange component 251 extends outwardly to serve as a bead lock preventing axial displacement of the outboard bead 256 from its seat, even when the tire is deflated.

The attachment flanges 252 and 253 are formed with channels 259 and 260 respectively which incorporate sealing rings 261 and 262 respectively which extend in polygonal configuration around fastening studs 263 substantially as described with reference to FIGS. 1 and 2. Thus both portions of the rim are sealed one to each side of the intermediate flange component 251.

In the embodiments described above which employ an O-ring in polygonal configuration it has been found that secure location of the O-ring during assembly is achieved if it is designed to be extended by 3 – 5% in circumferential length when stretched around the fastening members. Slight inaccuracies in the axial thickness of the O-ring are not important, since the controlled compression between the sidewalls can normally be arranged to be sufficient to ensure a seal. However, if sealing of the O-ring against the sidewalls of the groove is not perfect some leakage may take place at low inflation pressures: higher pressure (say 25 pounds per square inch) will then force the sealing ring radially inwardly to seal on three sides against the two sidewalls and the radially inner wall of the channel, and this form of sealing can be achieved more easily and rapidly if the O-ring is greased, e.g. with a silicone grease, before assembly.

One further benefit obtained from using a channel which is relatively wide in the radial sense is that the parts of the attachment flanges between the spaced annular ribs are stressed by the fastening studs and therefore act as "spring washers" tending to hold the fastening members under tension at all times and thereby to prevent the securing nuts from loosening in service. A spring washer effect may also be produced by manufacturing the two rim portions so that when assembled together, before tightening the securing nuts, the attachment flanges are at a small angle to one another. For example the inner rib bounding the channel may make contact with the flange of the opposite rim portion while a small clearance exists between the attachment flanges in the radially outer region. When the nuts are tightened the attachment flanges are then forced into parallel relationship and the resultant stress set up in the flanges helps to prevent loosening of the nuts in service.

In the embodiments described above the studs which fasten the two rim portions together are fitted in the outboard rim portion, the associated nuts lying on the inboard side: this arrangement could of course be reversed, the studs then being fitted in the inboard rim portion and the nuts being accessible from the outboard side.

While in the embodiments described above the wheel assemblies are intended primarily for use on motor cars and other road or "off-the-road" vehicles, the invention is also applicable to other types of wheels, such as aircraft wheels.

Having now described our invention — what we claim is:

1. A wheel rim comprising a pair of rim portions having annular attachment flanges extending inwardly in the radial sense relative to the axis of rotation of the rim, fastening means to provide an axial clamping load to urge the attachment flanges towards one another, and a sealing ring located in a circumferentially extending channel formed between the attachment flanges and bounded by circumferentially extending radially spaced-apart abutment zones through which substantially the whole axial clamping load on the attachment flanges is carried, the sealing ring being of smaller width, measured in the radial direction relative to the rim, than the width of the channel measured in said radial direction.

2. A wheel rim according to claim 1 wherein the axial depth of the channel and the thickness in the axial direction of the sealing ring provide, when the rim is fully assembled, a compression of the sealing ring to a thickness in the axial direction within the range 50% 70% of its unstressed thickness.

3. A wheel rim according to claim 1 wherein the sealing ring is located within the channel in a polygonal configuration, the ring passing around locating abutments in circumferentially spaced-apart positions within the channel.

4. A wheel rim according to claim 1 wherein said fastening means comprise a series of axially extending fastening members extending through the attachment flanges and the channel to secure the attachment flanges together, the sealing ring passing around the radially inner surfaces of the fastening members and a resilient sealing washer being provided around each fastening member.

5. A wheel rim according to claim 4 wherein the resilient washers are formed integrally with the sealing ring.

6. A wheel rim according to claim 5 wherein the sealing ring additionally comprises an integrally formed radially outer portion extending circumferentially around the channel and passing around the outer surfaces of the fastening members.

7. A wheel rim according to claim 1 wherein the sealing ring is in the form of an annular band, pierced to enable said fastening means to pass therethrough.

8. A wheel rim according to claim 7 wherein the sides of the band are each provided with at least one projecting rib for sealing engagement with the channel.

9. A wheel rim comprising a pair of rim portions having annular attachment flanges extending inwardly in the radial sense relative to the axis of rotation of the rim, fastening means to provide an axial clamping load to urge the attachment flanges towards one another, and a sealing ring located in a circumferentially extending channel formed between the attachment flanges and bounded by circumferentially extending radially spaced-apart abutment zones through which substantially the whole axial clamping load on the attachment flanges is carried, the fastening means comprising a series of axially extending fastening members passing through the attachment flanges and the channel, the sealing ring being located in the said channel so as to pass around the radially outer surface, relative to the axis of rotation of the rim, of the portions of the fastening member which lie within the channel, the sealing ring being of smaller width, measured in the radial direction relative to the rim, than the width of the channel measured in said radial direction.

10. A wheel rim according to claim 9 wherein the sealing ring is assembled around the fastening members under slight tension so that it tends to lie in a polygonal configuration within the channel.

11. A wheel rim according to claim 9 wherein the attachment flanges of the respective rim portions lie adjacent one another.

12. A wheel rim according to claim 9 wherein the sealing ring is of elastomeric material.

13. A wheel rim according to claim 9 wherein the sealing ring is of substantially circular cross-section when unstressed.

14. A wheel rim according to claim 9 wherein the sides of the channel have substantially flat radially-extending surfaces.

15. A wheel rim according to claim 9 wherein the axial depth of the channel and the thickness in the axial direction of the sealing ring provide, when the rim is fully assembled, a compression of the sealing ring to a thickness in the axial direction within the range 50% to 70% of its unstressed thickness.

16. A wheel rim according to claim 9 wherein the circumferentially extending abutment zones are defined by a radially inner annular rib and a radially outer annular rib formed on one rim portion.

17. A wheel rim according to claim 16 wherein said fastening means comprise axially extending fastening members which pass through the attachment flanges and the channel, the sealing ring extends around said axially extending fastening members, and the radially inner rib is formed with a profile as viewed in the axial direction such that the inner rib extends closely adjacent to the sealing ring between the fastening members to provide support to the portions of the sealing ring between the fastening members so as to limit radially inward movement of the sealing ring under inflation pressure.

18. A wheel rim according to claim 17 wherein the inner rib passes in a generally part-circular arc around each fastening member.

19. A wheel rim according to claim 17 wherein the radially outer rib is formed with a profile as viewed in the axial direction such that it extends in a substantially part-circular arc around each fastening member.

20. A wheel rim according to claim 9 wherein the channel is of tapering cross-section considered in a plane containing the axis of the rim, the channel having a smaller axial width in its radially inner region than in its radially outer region.

21. A wheel rim according to claim 9 further comprising an opening for an inflation valve adaptor in one attachment flange, an inflation valve adaptor mounted in said opening, said opening communicating with the channel at a point radially outward, relative to the rim, of the sealing ring and the radially outer abutment zone includes means defining a fluid communication path between the channel and the radially outer surface of the rim.

22. A wheel rim according to claim 21 wherein the inflation valve adaptor has a stem passing through the opening and a head within the channel making sealing engagement with the opening, an axial passage being formed through the stem to communicate with the channel.

23. A wheel rim according to claim 22 further comprising a resilient sealing ring around the stem of the adaptor adjacent the head thereof for engagement with a sealing surface formed around the opening.

24. A wheel rim according to claim 23 wherein said sealing surface is chamfered.

25. A wheel rim according to claim 22 wherein the head of the valve adaptor is arranged within the channel so as to contact the channel opposite to the opening through which the stem of the valve adaptor passes whereby the fastening means which urge the attachment flanges axially towards one another also serve to press the head of the valve adaptor towards the flange through which its stem passes and thus ensure sealing of the valve adaptor against the portion of the respective flange surrounding said opening.

26. A wheel rim according to claim 22 wherein the head of the valve adaptor is formed with at least one groove in the end surface thereof, said groove communicating with the channel and with the axial passage through said stem.

27. A wheel assembly according to claim 9 wherein both the said rim portions are detachably secured to a wheel body portion.

28. A wheel assembly according to claim 27 wherein the attachment flanges are located by spigot means on said wheel body portion against radial displacement relative to one another.

29. A wheel assembly according to claim 28 wherein said spigot means comprises a plurality of location shoulders formed on the wheel body portion for engagement with the radially inner edge of the outboard attachment flange, and an axially turned locating lip at the radially outer edge of the wheel body portion to locate the inboard rim portion.

30. A wheel assembly according to claim 28 wherein the radially outer portion of the wheel body portion is provided with a series of axially extending lugs for location of the radially inner edges of the attachment flanges of the two rim portions.

31. A wheel assembly according to claim 27 wherein said wheel body portion includes an outer radially extending mounting flange portion arranged to be clamped to the attachment flanges of the two rim portions by said fastening members which pass through all three of said flanges.

32. A wheel assembly according to claim 27 wherein the wheel body portion is of light metallic alloy and the rim portions are of sheet metal.

33. A wheel assembly comprising a wheel rim according to claim 9 and a wheel body portion which comprises a radially outwardly extending mounting flange which extends between the rim attachment flanges, the areas of junction of each attachment flange with the mounting flange each being provided with a channel and sealing ring.

34. A wheel assembly according to claim 33 wherein the mounting flange extends radially outwardly to provide a bead lock.

35. A wheel assembly according to claim 9 wherein one rim portion is formed integrally with a wheel body portion.

36. A wheel assembly according to claim 35 wherein said one rim portion formed integrally with said wheel body portion is of light metallic alloy and the other rim portion is of sheet metal.

37. A wheel rim assembly according to claim 9 wherein the attachment flange of the outboard rim portion is formed adjacent the inboard end of the tire bead seating region thereof, and wherein the inboard rim portion is substantially cylindrical, the rim portions forming, when secured together, a radially inwardly tapering groove along their circumferential line of junction into which the toe of an associated outboard tire bead may project.

38. A wheel rim and tire assembly comprising a wheel rim assembly according to claim 37 having mounted thereon a tire the outboard bead of which is formed with an extending tapering toe portion which projects into the said groove and rests freely therein.

39. A wheel rim comprising:
a pair of rim portions each having an annular attachment flange extending radially inward relative to the axis of rotation of the rim, said flanges defining a circumferentially extending channel therebetween with said flanges circumferentially abutting each other at each radial end of the channel,
fastening means for clamping the attachment flanges together,
a substantially annular sealing ring in said channel, said sealing ring being of substantially smaller width, measured radially relative to the axis of rotation of the rim, than the width of the channel so measured, whereby substantially the entire axial clamping load on the attachment flanges is carried by the circumferential abutment of the flanges at each radial end of the channel.

40. The wheel rim of claim 39 further comprising a series of circumferentially spaced axially extending locating members in the channel, and the width of the sealing ring and channel and the circumferential spacing of the locating members are such that the sealing ring extends in a substantially straight line between each pair of next adjacent locating members.

41. The wheel rim of claim 40 wherein said fastening means comprises a series of circumferentially spaced axially extending fastening members, some of which are said locating members.

42. A wheel rim comprising:
a pair of rim portions each having an annular attachment flange extending radially inward relative to the axis of rotation of the rim,
fastening means to provide an axial clamping load to urge the attachment flanges toward one another, and
a substantially annular sealing ring located in a circumferentially extending channel formed between said attachment flanges and bounded by circumferentially extending radially spaced-apart abutment zones through which substantially the whole axial clamping load on the attachment flanges is carried, said sealing ring being of a width, measured radially relative to the rim, which is less than half the width of the channel so measured.

43. A wheel rim comprising:
a pair of rim portions each having an annular attachment flange extending radially inward relative to the axis of rotation of the rim, said flanges defining a circumferentially extending channel therebetween with said flanges circumferentially abutting each other at each radial end of the channel,
a series of circumferentially spaced axially extending fastening members passing through the attachment flanges and the channel for clamping the attachment flanges together,
a substantially annular sealing ring in said channel, said sealing ring being of a substantially smaller width, measured radially relative to the axis of rotation of the rim, than the width of the channel so measured, said sealing ring passing around only the radially outer surface, relative to the axis of rotation of the rim, of the portions of each fastening member which lie within the channel, whereby substantially the entire axial clamping load on the attachment flanges is carried by the circumferential abutment of the flanges at each radial end of the channel.

44. A wheel assembly comprising:
a wheel rim, said rim comprising:
a pair of rim portions each having an annular attachment flange extending radially inwardly relative to the axis of rotation of the rim,
a wheel body portion comprising a radially outwardly extending mounting flange,
said mounting flange extending between the attachment flanges, each attachment flange and the mounting flange defining a respective circumferentially extending channel therebetween with each attachment flange circumferentially abutting the mounting flange at each radial end of its respective channel,
fastening means for clamping the attachment flanges and mounting flange together,
a substantially annular sealing ring in each channel, each sealing ring being of substantially smaller width, measured radially relative to the axis of rotation of the rim, than the width of its respective channel so measured, whereby substantially the entire axial clamping load on the attachment and mounting flanges is carried by the circumferential abutment of each attachment flange with said mounting flange at each radial end of its respective channel.

45. A wheel assembly as claimed in claim 44 wherein said mounting flange extends radially outwardly of the attachment flanges to provide a bead lock.

46. A wheel assembly as claimed in claim 44 wherein the channels are of the same width and are axially aligned.

* * * * *